United States Patent
Lindoff et al.

(10) Patent No.: US 10,004,002 B2
(45) Date of Patent: Jun. 19, 2018

(54) METHOD FOR D2D RADIOCOMMUNICATION

(71) Applicant: Telefonaktiebolaget L M Ericsson (publ), Stockholm (SE)

(72) Inventors: Bengt Lindoff, Bjarred (SE); Qianxi Lu, Beijing (CN); Qingyu Miao, Beijing (CN); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days. days.

(21) Appl. No.: 14/430,216

(22) PCT Filed: Sep. 28, 2012

(86) PCT No.: PCT/CN2012/082394
§ 371 (c)(1),
(2) Date: Mar. 21, 2015

(87) PCT Pub. No.: WO2014/047907
PCT Pub. Date: Apr. 3, 2014

(65) Prior Publication Data
US 2015/0249937 A1  Sep. 3, 2015

(51) Int. Cl.
*H04W 36/00* (2009.01)
*H04W 76/02* (2009.01)
(Continued)

(52) U.S. Cl.
CPC ........ *H04W 36/0011* (2013.01); *H04W 4/008* (2013.01); *H04W 36/00* (2013.01);
(Continued)

(58) Field of Classification Search
CPC ................................................. H04W 36/0011
See application file for complete search history.

(56) References Cited

U.S. PATENT DOCUMENTS 8,155,102 B1    4/2012  Hakola et al.
2005/0232212 A1*  10/2005  Kang ................ H04W 36/0061
                                                            370/338
(Continued)

FOREIGN PATENT DOCUMENTS

CN    101772199 A    7/2010
CN    102388666 A    3/2012
(Continued)

OTHER PUBLICATIONS

PCT International Search Report, dated Jul. 11, 2013, in connection with International Application No. PCT/CN2012/082394, all pages.
(Continued)

*Primary Examiner* — John Blanton
(74) *Attorney, Agent, or Firm* — Leffler Intellectual Property Law, PLLC

(57) ABSTRACT

The present disclosure relates to a method of a first radio device in non-network assisted device-to-device (D2D) communication with a second radio device using a first frequency resource and a first communication protocol. The method comprises determining that the first radio device is within coverage of a cellular network. The method also comprises connecting to the cellular network. The method also comprises sending a message to the second radio device, informing said second radio device that the first radio device is within coverage of the cellular network. The method also comprises receiving a message from the cellular network comprising information about a second frequency resource and a second communication protocol. The method also comprises initiating a handover of the D2D communication from the first frequency resource and communication protocol to the second frequency resource and communication protocol.

15 Claims, 5 Drawing Sheets

(51) Int. Cl.
*H04W 4/00* (2018.01)
*H04W 36/16* (2009.01)
*H04W 72/04* (2009.01)
*H04W 84/04* (2009.01)

(52) U.S. Cl.
CPC ..... *H04W 36/165* (2013.01); *H04W 72/0453* (2013.01); *H04W 76/023* (2013.01); *H04W 84/042* (2013.01)

(56) References Cited

U.S. PATENT DOCUMENTS

| | | |
|---|---|---|
| 2006/0098598 A1 | 5/2006 | Gallagher |
| 2010/0279672 A1 | 11/2010 | Koskela et al. |
| 2011/0063995 A1 | 3/2011 | Chen et al. |
| 2011/0268004 A1* | 11/2011 | Doppler ................ H04W 72/02 370/311 |
| 2012/0184306 A1* | 7/2012 | Zou ..................... H04W 76/023 455/458 |
| 2013/0150051 A1* | 6/2013 | Van Phan ............. H04W 12/04 455/437 |
| 2013/0183932 A1* | 7/2013 | Lemilainen ........... H04W 12/04 455/411 |
| 2013/0308598 A1* | 11/2013 | Madan ................. H04W 36/18 370/331 |

FOREIGN PATENT DOCUMENTS

| | | |
|---|---|---|
| CN | 102422703 A | 4/2012 |
| WO | 2004077920 A2 | 9/2004 |
| WO | 2010082114 A1 | 7/2010 |
| WO | 2011109027 A1 | 9/2011 |
| WO | 2011147462 A1 | 12/2011 |

OTHER PUBLICATIONS

PCT Written Opinion, dated Jul. 11, 2013, in connection with International Application No. PCT/CN2012/082394, all pages.
European Communication dated Nov. 24, 2016 in connection with European Application No. 12885937.8, all pages.
Supplementary European Search Report, dated Apr. 14, 2016, in connection with European Application No. 12885937, all pages.
Doppler K et al., Device-to-device communication as an underlay to LTE-advanced networks, IEEE Communications Magazine, IEEE Service Center, Piscataway, US, vol. 47, No. 12, Dec. 1, 2009, pp. 42-49.
European Communication dated Apr. 18, 2017 in connection with European Application No. 12885937.8, all pages.

* cited by examiner

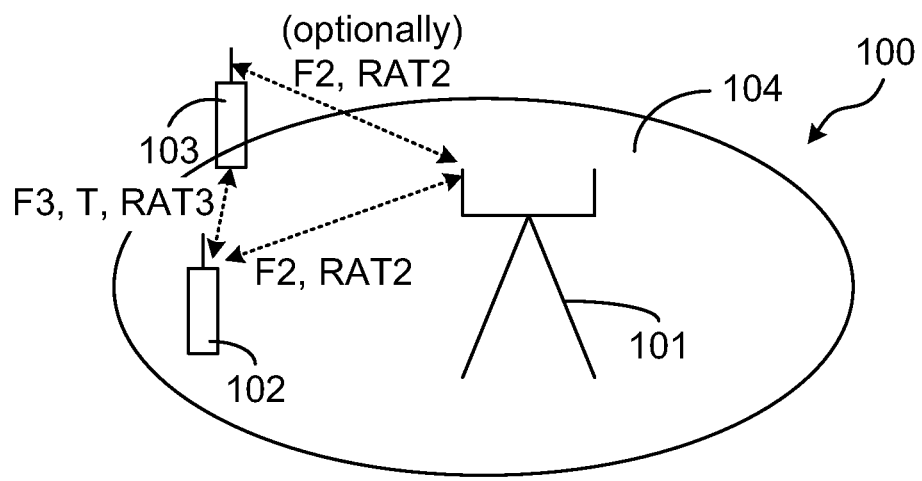
Fig. 1C1
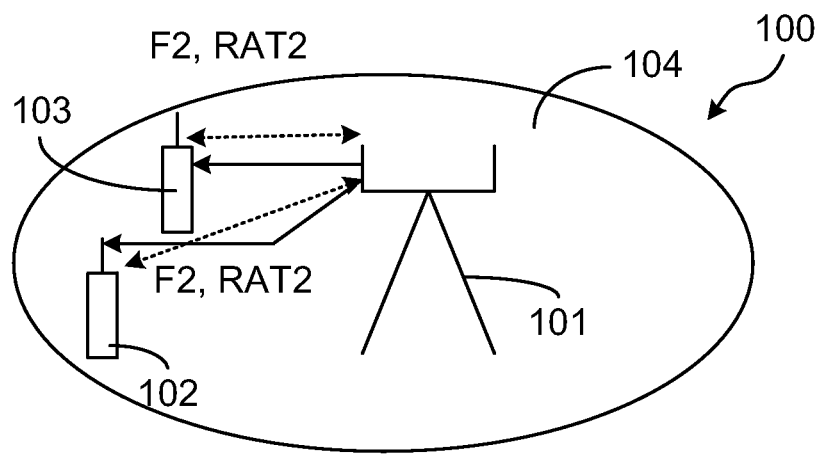
Fig. 1C2

METHOD FOR D2D RADIOCOMMUNICATION

TECHNICAL FIELD

The invention relates to methods and devices of non-network assisted device-to-device (D2D) communication between a first radio device and a second radio device using a first frequency resource and a first communication protocol.

BACKGROUND

Device-to-Device (D2D) communication refers to direct communication between devices. In D2D communication, data to be transmitted from a first device to a second device is typically not relayed via any cellular network. Some examples of D2D communication of the prior art are Bluetooth communication, FlashlinQ communication, Wireless Local Area Network (WLAN, e.g. IEEE 802.11) communication (e.g. WIFI Direct).

Device-to-device communication may be applicable in various scenarios. One scenario is when a cellular radio access network is present, and able to set up a cellular connection between two devices. D2D communication may be a complement to the cellular communication in such scenarios.

There may be situations when D2D communication may provide better performance (better signal quality, higher bit rate, lower latency, etc) than cellular communication. This may be due to proximity between the devices and/or specific signaling gain of the D2D protocol (e.g. hop gain).

In some situations, the network may have constraints (e.g. due to being heavily loaded) resulting in that a service cannot be provided at all using a network connection. Then, D2D communication would be an alternative.

There may also be situations when D2D communication may be preferred by the user of a device (e.g. due to billing costs).

D2D communication may improve spectrum efficiency and reduce the network load for the cellular network, since the D2D connection typically uses another spectrum range (e.g. an unlicensed spectrum) than the cellular network (typically licensed spectrum). Furthermore, since cellular communication uses an uplink-downlink pair for each of the two devices while a D2D connection would only use one link pair, spectrum efficiency is improved even if the D2D connection would use cellular spectrum resources. This would be true even for network assisted D2D communication where most of the data would be transmitted over the D2D connection and only a small amount of information is to be transmitted over the network link.

D2D communication may be ad hoc or may be network assisted. For example, a cellular network may assist a D2D connection by establishing security of the D2D link and/or partly or fully controlling the setup of the D2D connection (e.g. device/peer discovery and resource allocation). A cellular network may also assist D2D communication by controlling the interference environment. For example, if using licensed operator's spectrum for the D2D communication, higher reliability can be provided than when operating in unlicensed spectrum. To assist the D2D connection, the network may also provide synchronization and/or partial or full Radio Resource Management (RRM—may e.g. comprise time and/or frequency resource allocation for the D2D communication).

In a typical cellular communication system, there are standardized procedures for connection setup and connection release (disconnection). There are typically also defined procedures for how to act in radio link failure (RLF), a scenario when a radio link is lost in an uncontrolled way (without connection release being performed). Such scenarios may be encountered e.g. when a device goes out of coverage, due to erroneous device operation, due to battery removal, etc.

Radio link monitoring procedures is typically defined for prior art cellular systems. Such procedures may include the device monitoring the radio channel and synchronization status with the network and define how to proceed of e.g. the synchronization is lost.

For example in Wideband Code Division Multiple Access (WCDMA) and Long Term Evolution (LTE), the wireless communication device monitors the down link (DL) channel conditions and determines whether the DL is in-sync or out-of-sync. This determination may be based on whether the device can reliably decode the DL information. If out-of-sync is detected, the device is to perform a number of actions, e.g. start higher layer connection release timers (indicating how long the device should try to re-synchronize before performing a formal connection release) and set transmission constraints (to limit the potential interference caused by the device if transmitting without reliable detection of DL power control information).

SUMMARY

It is an objective of the present disclosure to provide improved methods and devices for enabling handovers from non-network assisted D2D communication to network (NW) assisted D2D communication or to cellular communication via the NW.

According to an aspect of the present disclosure, there is provided a method of a first radio device in non-network assisted device-to-device (D2D) communication with a second radio device using a first frequency resource and a first communication protocol. The method comprises determining that the first radio device is within coverage of a cellular network. The method also comprises connecting to the cellular network. The method also comprises sending a message to the second radio device, informing said second radio device that the first radio device is within coverage of the cellular network. The method also comprises receiving a message from the cellular network comprising information about a second frequency resource and a second communication protocol. The method also comprises initiating a handover of the D2D communication from the first frequency resource and communication protocol to the second frequency resource and communication protocol.

In some embodiments, the above method comprises the first radio device sending a message to the second radio device, informing said second radio device of the second frequency resource and the second communication protocol received from the network. Thus, also the second radio device can prepare for and cooperate with the first radio device in initiating the handover. Alternatively, if also the second radio device has managed to connect to the NW, the second radio device will have received this information from the NW.

According to another aspect of the present disclosure, there is provided a method of a second radio device in non-network assisted D2D communication with a first radio device using a first frequency resource and a first communication protocol. The method comprises receiving a message from the first radio device, informing the second radio device that said first radio device is within coverage of the cellular network. The method also comprises receiving a message from the first radio device, informing the second radio device of a second frequency resource and a second communication protocol. The method also comprises initiating a handover of the D2D communication from the first frequency resource and communication protocol to the second frequency resource and communication protocol.

According to another aspect of the present disclosure, there is provided a method of a network node of a cellular network. The method comprises allowing a first radio device to connect to the cellular network via the network node, said first radio device being in non-network assisted D2D communication with a second radio device using a first frequency resource and a first communication protocol. The method also comprises sending a handover message to the first radio device, comprising information about a second frequency resource and a second communication protocol to which handover of the D2D communication should be initiated. The method also comprises receiving an acknowledgement from the first radio device and relating to the sent handover message.

In some embodiments, the acknowledgement received by the network node is an acknowledgement which is received as an acknowledgement (ACK) of that the handover message has been received ok by the first radio device. In some embodiments, the acknowledgement received by the network node is an acknowledgement which is received as an acknowledgement that the handover will be performed and/or has been competed.

According to another aspect of the present disclosure, there is provided a computer program product comprising computer-executable components for causing a device, such as the first radio device, the second radio device or the network node discussed herein, to perform an embodiment of a method of the present disclosure when the computer-executable components are run on a processor comprised in the device.

According to another aspect of the present disclosure, there is provided a computer program for a first radio device in non-network assisted D2D communication with a second radio device using a first frequency resource and a first communication protocol. The computer program comprises computer program code which is able to, when run on a processor of the first radio device, cause the first radio device to determine that the first radio device is within coverage of a cellular network. The code also causes the first radio device to connect to the cellular network. The code also causes the first radio device to send a message to the second radio device, informing said second radio device that the first radio device is within coverage of the cellular network. The code also causes the first radio device to receive a message from the cellular network comprising information about a second frequency resource and a second communication protocol. The code also causes the first radio device to initiate a handover of the D2D communication from the first frequency resource and communication protocol to the second frequency resource and communication protocol.

According to another aspect of the present disclosure, there is provided a computer program for a second radio device in non-network assisted D2D communication with a first radio device using a first frequency resource and a first communication protocol. The computer program comprises computer program code which is able to, when run on a processor of the second radio device, cause the second radio device to receive a message from the first radio device, informing the second radio device that said first radio device is within coverage of the cellular network. The code also causes the second radio device to receive a message from the first radio device, informing the second radio device of a second frequency resource and a second communication protocol. The code also causes the first radio device to initiate a handover of the D2D communication from the first frequency resource and communication protocol to the second frequency resource and communication protocol.

According to another aspect of the present disclosure, there is provided a computer program for a network node of a cellular network. The computer program comprises computer program code which is able to, when run on a processor of the network node, cause the network node to allow a first radio device to connect to the cellular network via the network node, said first radio device being in non-network assisted D2D communication with a second radio device using a first frequency resource and a first communication protocol. The code also causes the network node to send a handover message to the first radio device, comprising information about a second frequency resource and a second communication protocol to which handover of the D2D communication should be initiated. The code also causes the network node to receive an acknowledgement from the first radio device and relating to the sent handover message.

According to another aspect of the present disclosure, there is provided a computer program product comprising an embodiment of a computer program of the present disclosure and a computer readable means on which the computer program is stored.

According to another aspect of the present disclosure, there is provided a first radio device configured for being in non-network assisted D2D communication with a second radio device using a first frequency resource and a first communication protocol. The first radio device comprises a processor, and a storage unit storing instructions that, when executed by the processor, cause the radio device to determine that the first radio device is within coverage of a cellular network. The instructions also cause the first radio device to connect to the cellular network. The instructions also cause the first radio device to send a message to the second radio device, informing said second radio device that the first radio device is within coverage of the cellular network. The instructions also cause the first radio device to receive a message from the cellular network comprising information about a second frequency resource and a second communication protocol. The instructions also cause the first radio device to initiate a handover of the D2D communication from the first frequency resource and communication protocol to the second frequency resource and communication protocol.

According to another aspect of the present disclosure, there is provided a second radio device configured for being in non-network assisted D2D communication with a first radio device using a first frequency resource and a first communication protocol. The second radio device comprises a processor, and a storage unit storing instructions that, when executed by the processor, cause the radio device to receive a message from the first radio device, informing the second radio device that said first radio device is within coverage of the cellular network. The instructions also cause the second radio device to receive a message from the first radio device, informing the second radio device of a second frequency resource and a second communication protocol. The instructions also cause the second radio device to initiate a handover of the D2D communication from the first frequency resource and communication protocol to the second frequency resource and communication protocol.

According to another aspect of the present disclosure, there is provided a network node of a cellular network. The network node comprises a processor, and a storage unit storing instructions that, when executed by the processor, cause the network node to allow a first radio device to connect to the cellular network via the network node, said first radio device being in non-network assisted D2D communication with a second radio device using a first frequency resource and a first communication protocol. The instructions also cause the Network node to send a message to the first radio device, comprising information about a second frequency resource and a second communication protocol to which handover of the D2D communication should be initiated. The instructions also cause the second radio device to receive an acknowledgement from the first radio device and relating to the sent handover message.

It is an advantage to, in accordance with any of the above aspects of the present disclosure, enable a handover of a non-NW assisted D2D communication to a communication aided by a cellular NW, NW assisted D2D or cellular communication, when at least one of the radio devices are within coverage of the cellular network. By the first radio device connecting to the network and receiving a message from the network comprising information about a second frequency resource and a second communication protocol, the radio device, or both radio devices in cooperation, may initiate the handover. The on-going communication between the radio devices may then not be interrupted at all in case of a handover to NW aided communication, or the time period of any interruption can at least be reduced. It may be desirable to communicate with the aid of the network if available, since a better performance may be achieved with the aid of the network with regard to e.g. synchronization and quality of service (QoS). Also, it is advantageous to enable communication between two radio devices which can more easily be handed over between different kinds of communication and different resources depending on whether the devices are within coverage of a cellular network or not. The communication between the devices is then made more robust and the risk of interruption of the ability of the devices to communicate with each other is reduced. This can be important e.g. in National Security and Personal Safety (NSPS) scenarios, where for instance police radio communication could function more robustly, regardless of NW coverage, by means of the present disclosure.

In some embodiments, the network node is one of a base station, such as a Node B or evolved Node B, a radio access network (RAN) node, or a core network (CN) node. If the network node discussed herein is not a base station, the first radio device may connect to the network node via a base station and/or other network node(s).

In some other embodiments, the handover is made to network assisted D2D communication. This implies that the communication between the devices after handover from non-NW assisted D2D communication is D2D communication but that this D2D communication is assisted by the NW where the NW e.g. controls that the D2D communication is in sync with the NW and/or specifies the scheduling resources for the D2D communication.

In some embodiments, both the first and the second radio devices are connected to the network/network node and the radio communication between the first and second radio devices after the handover is via said network/network node. This implies that the communication between the devices prior after handover from D2D communication is cellular communication via the network.

In some embodiments, the first radio device is connected to the cellular network via a first network node and the second radio device is connected to the cellular network via a second, different, network node before the initiating of the handover. The first and second network nodes may e.g. be base stations. This allows handover to e.g. cellular communication via the NW. The first and second network nodes may then communicate or cooperate with each other for enabling the handover.

In some embodiments, the first frequency resource is within an unlicensed frequency band. Thus it may not interfere with communication within the licenced bands, e.g. with the cellular network and network node discussed herein. The unlicensed frequency bad may e.g. be an industrial, scientific and medical (ISM) radio band.

In some embodiments, the first communication protocol is one of a Wireless Local Area Network protocol e.g. Wi-Fi Direct, a Bluetooth protocol, or a Zigbee protocol. In some other embodiments, the first communication protocol is an LTE D2D communication protocol. It is conceivable that an LTE standard for D2D communication, NW assisted as well as non-NW assisted, will be developed, possibly allowing D2D communication to be performed in a licenced LTE frequency band. In general, the first communication protocol may be any protocol possible for non-NW assisted D2D communication, e.g. an ad hoc network protocol.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which:

FIG. 1C1 is a schematic illustration of an embodiment of a D2D communication where both radio devices are within coverage of the cellular network of FIG. 1A.

FIG. 1C2 is a schematic illustration of another embodiment of a communication between two radio devices where both radio devices are within coverage of the cellular network of FIG. 1A.

FIG. 2 is a schematic block diagram of an embodiment of a network node of the present disclosure.

DETAILED DESCRIPTION

Figure 1A:
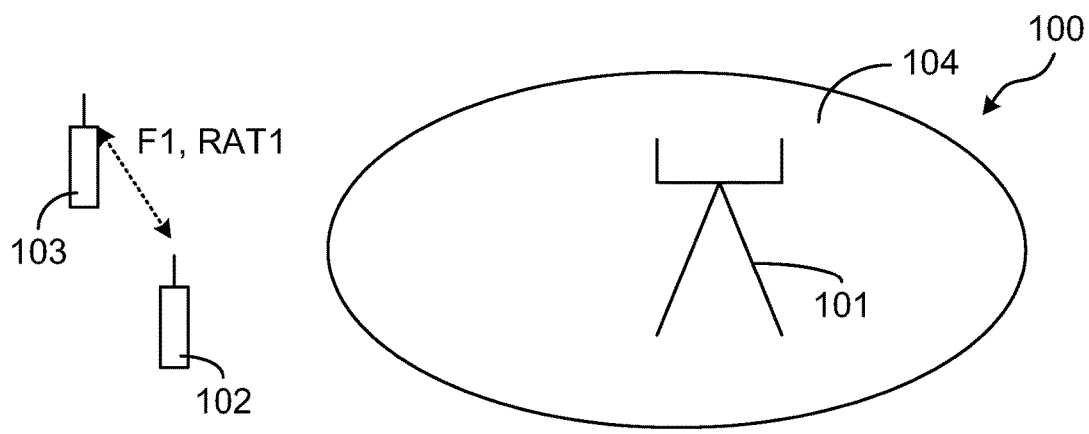
FIG. 1A is a schematic illustration of an embodiment of a D2D communication outside the coverage of a cellular network.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

There are herein discussed three different types of communications or communication paths between the first and second radio devices:
1. Cellular radio communication, where the data which is transmitted between the two radio devices passes via the network.
2. Network assisted D2D communication, where at least one of the radio devices is connected to and in sync with the network, and exchanges information with the network for maintaining a D2D communication with the other radio device where at least a part of the data transmitted between the radio devices is transmitted directly and does not pass via the network.
3. Non-NW assisted D2D, where the first and second devices communicates directly with each other without involving the NW.

When it is herein stated that the radio communication between the first radio device and the second radio device is by means of a network node, this includes both the situation 1. of cellular radio communication and the situation 2. of network assisted D2D. In both cases, the communication is by means of/aided by/controlled by the network, e.g. by the network node or higher up in the network via the network node. The present disclosure relates to facilitating a handover (HO) from the situation 3. to one of the situations 1. and 2.

It should be noted that it is conceivable that network assisted D2D may be performed even if only the first radio device is covered by the NW (is connected to the network node). In that case, the first radio device can forward information from the network node to the second radio device, just as the first radio device can forward any information received from the network node about the second frequency resource and communication protocol to the second radio device.

A frequency resource as discussed herein is frequency/frequencies or one or more frequency band(s)/spectrum(s) which is used or can be used by the first and/or second radio devices for communicating with each other, either (in case of the first frequency recourse) via the network or D2D. In case of an Orthogonal Frequency Division Multiplexing (OFDM) system, a frequency resource may be a set of sub-carriers. For instance in LTE, the frequency resource may be a set of resource blocks (each resource block consisting of e.g. 12 sub-carriers).

Similarly, a communication protocol is any communication protocol or standard or ratio access technology (RAT) which can be used by the first and/or second radio devices for communicating with each other, either (in case of the first communication protocol) via the network or D2D. Examples of communication protocols include Long Term Evolution (LTE) standards and Wideband Code Division Multiple Access/High Speed Packet Access (WCDMA/HSPA) standards.

Non-assisted D2D communication may be in accordance with one of a Wireless Local Area Network protocol e.g. Wi-Fi Direct, a Bluetooth protocol, a FlashlinQ protocol, or a Zigbee protocol. It is also conceivable that an LTE D2D communication protocol is used. It is conceivable that an LTE standard for D2D communication, NW assisted as well as non-NW assisted, will be developed, possibly allowing D2D communication to be performed in a licenced LTE frequency band.

Non-assisted D2D communication may be performed within an unlicensed frequency band. Thus it may not interfere with communication within the licenced bands, e.g. with the cellular network of the network node discussed herein. The unlicensed frequency bad may e.g. be an industrial, scientific and medical (ISM) radio band.

The radio device may be any device, mobile or stationary, enabled to communicate over a radio cannel, for instance but not limited to e.g. mobile phone, smart phone, modems, sensors, meters, vehicles, household appliances, medical appliances, media players, cameras, or any type of consumer electronic, for instance but not limited to television, radio, lighting arrangements, tablet computer, laptop, or PC.

The cellular NW which comprises the NW node discussed herein, may be any cellular network, in accordance with any communication standard, able to communicate with a radio device over a radio interface. Examples of communication standards are the 3GPP standards, such as an LTE or Wideband Code Division Multiple Access/High Speed Packet Access (WCDMA/HSPA) standard.

FIG. 1 (A, B, C1 & C2) schematically illustrates an embodiment of a cellular network 100 comprising a radio access network (RAN) comprising a base station 101, which may be the network node discussed herein, to which the first radio device 102 connects, the base station 101 serving a cell 104 having a coverage area (an area within which a radio device can connect to the network via the base station 101) indicated by the solid line encircling the base station 101. A first radio device 102 and a second radio device 103 are in communication with each other.

FIG. 1A illustrates the situation when the two radio devices 102 and 103 are in non-NW assisted D2D communication using a first frequency resource (F1) using a first communication protocol in the form of a first radio access technology (RAT1). Both devices are out of coverage with regard to the cellular communication network 100.

Figure 1B:
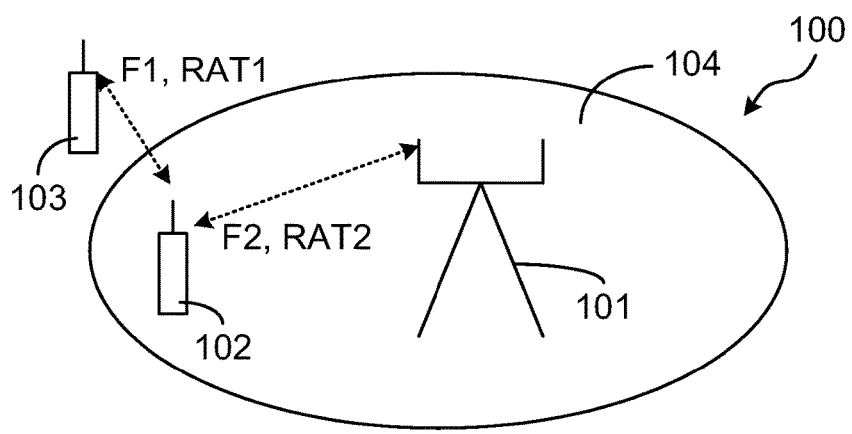
FIG. 1B is a schematic illustration of an embodiment of a D2D communication where one of the radio devices are within coverage of the cellular network of FIG. 1A.

FIG. 1B illustrates the situation when the first radio device 102 has come into NW coverage and communicates with the NW node 101 using a second frequency resource (F2) and a second radio access technology (RAT2).

FIG. 1C1 illustrates the situation when the NW 100 has taken control over the D2D communication (NW assisted D2D) and now the D2D communication is made using a third frequency resource (F3) which corresponds to the second frequency resource discussed herein, at specific time resources (T). F3 is in some embodiments the same or a subset of F1.

Also, a third radio access technology (RAT3) is used, which may be the same as RAT 2. RAT 3 corresponds to the second communication protocol discussed herein. In this case, the second radio device 103 could be in or out of NW coverage (if the second radio device 103 is outside of the NW coverage, information sent from the NW to the first radio device 102 may be forwarded to the second radio device 103 by the first radio device 102, while this information may be sent directly to the second radio device 103 from the NW 100 if the second radio device 103 is connected to the network node 101).

Figure 2:
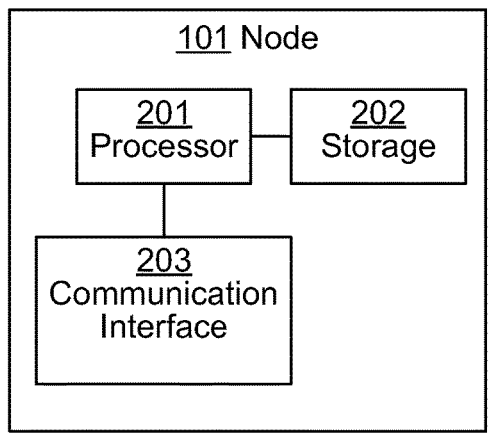

FIG. 1C2 illustrates the situation, alternative to the situation of FIG. 1C1, when he communication between the first and second radio devices 102 and 103 is made using cellular communication. Hence, the non-NW assisted D2D communication has been handed over to a standard cellular communication. In this embodiment, it is required that both the first and second radio devices 102 and 103 have come under cellular coverage of the NW 100.

It should be noted that the situations of FIGS. 1C1 and 1C2 also cover the case that the two radio devices 102 and 103 are within cellular coverage but are not connected to the same NW node/base station 101.

FIG. 2 is schematically illustrates an embodiment of a network node 101, e.g. similar to the base station 101 of FIG. 1. As mentioned above, the network node 101 may e.g. be part of the core network 104 or the radio access network (RAN) such as be comprised in the radio base station of FIG. 1. The network node 101 comprises a processor 201 e.g. a central processing unit (CPU). The processor 201 may comprise one or a plurality of processing units in the form of microprocessor(s). However, other suitable devices with computing capabilities could be comprised in the processor 201, e.g. an application specific integrated circuit (ASIC), a field programmable gate array (FPGA) or a complex programmable logic device (CPLD). The processor 201 is configured to run one or several computer program(s) or software stored in a storage unit 202 e.g. a memory. The storage unit is regarded as a computer readable means and may e.g. be in the form of a Random Access Memory (RAM), a Flash memory or other solid state memory, or a hard disk. The processor 201 is also configured to store data in the storage unit 202, as needed. The network node 101 also comprises a communication interface 203. The communication interface is configured for communication with the network 100. If the network node is located in a base station, the communication interface 203 is used to enable communication with the core network (CN) 104 and/or the radio devices 102 and 103 served by the base station. If the communication interface 203 is located in the CN, e.g. in a core network node, it may be used to communicate information to the radio device(s) via the base station.

Figure 3:
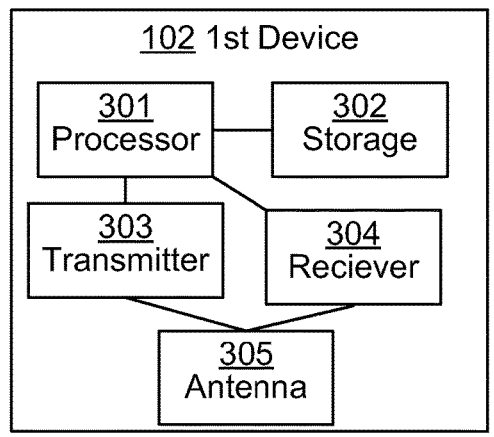
FIG. 3 is a schematic block diagram of an embodiment of a radio device of the present disclosure.

FIG. 3 schematically illustrates an embodiment of a first radio device 102 of the present disclosure. It is noted that the description of the first radio device with reference to FIG. 3 is also relevant to the second radio device 103. The radio device 102 comprises a processor or central processing unit (CPU) 301. The processor 301 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 301 is configured to run one or several computer program(s) or software stored in a storage unit or memory 302. The storage unit is regarded as a computer readable means and may e.g. be in the form of a Random Access Memory (RAM), a Flash memory or other solid state memory, or a hard disk. The processor 301 is also configured to store data in the storage unit 202, as needed. The radio device 102 also comprises a transmitter 303, a receiver 304 and an antenna 305, which may be combined to form a transceiver or be present as distinct units within the radio device 102. The transmitter 303 is configured to cooperate with the processor to transform data bits to be transmitted over a radio interface to a suitable radio signal in accordance with the RAT used by the RAN via which the data bits are to be transmitted. The receiver 304 is configured to cooperate with the processor 301 to transform a received radio signal to transmitted data bits. The antenna 305 may comprise a single antenna or a plurality of antennas, e.g. for different frequencies and/or for MIMO (Multiple Input Multiple Output) communication. The antenna 305 is used by the transmitter 303 and the receiver 304 for transmitting and receiving, respectively, radio signals.

Figure 4:
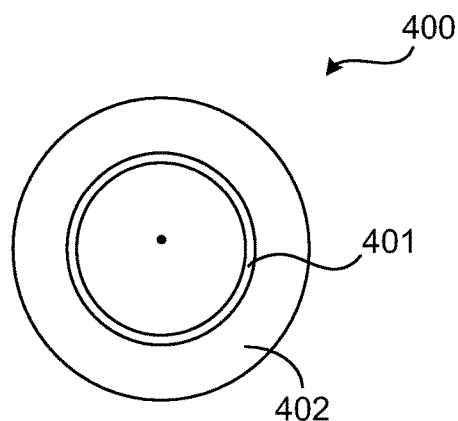
FIG. 4 is a schematic illustration of an embodiment of a computer program product of the present disclosure.

FIG. 4 illustrates a computer program product 400. The computer program product 400 comprises a computer readable medium 402 comprising a computer program 401 in the form of computer-executable components 401. The computer program/computer-executable components 401 may be configured to cause a device, e.g. a network node 101 or a radio device 102 or 103 as discussed above, to perform an embodiment of a method of the present disclosure. The computer program/computer-executable components may be run on the processing unit 201 or 301 of the device for causing the device to perform the method. The computer program product 400 may e.g. be comprised in a storage unit or memory 202 or 302 comprised in the device and associated with the processing unit 201 or 301. Alternatively, the computer program product 400 may be, or be part of, a separate, e.g. mobile, storage means, such as a computer readable disc, e.g. CD or DVD or hard disc/drive, or a solid state storage medium, e.g. a RAM or Flash memory.

Figure 5:
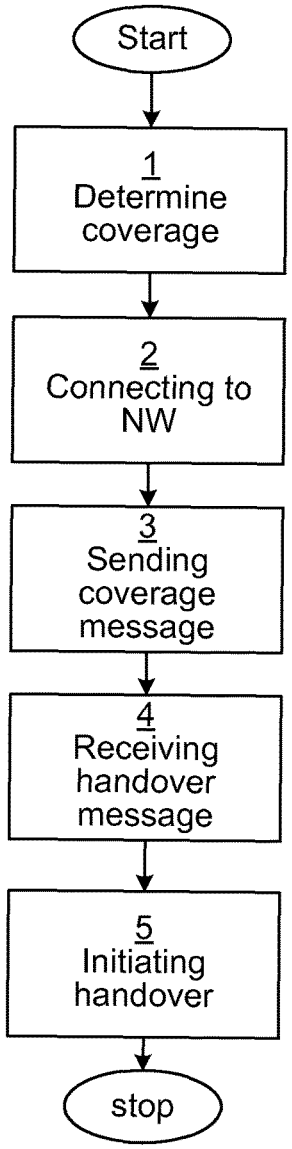
FIG. 5 is a schematic flow chart of an embodiment of a method of a first communication device, of the present disclosure.

FIG. 5 is a schematic flow chart of embodiments of a method of the present disclosure. The method of FIG. 5 is performed in the first radio device 102. The first radio device 102 is in non-NW assisted D2D radio communication with the second radio device 103. For this D2D communication, a first frequency resource and a first communication protocol is used. In this situation, the method embodiment of FIG. 5 can be applied. The first radio device 102 determines 1 that it is within coverage of a cellular network 100, e.g. inside the cell 104 of the base station 101. The first radio device connects 2 to the cellular network, e.g. to the network node base station 101. The first radio device 102 then sends 3 a coverage message to the second radio device, informing said second radio device that the first radio device is within coverage of the cellular network. Thus, the second radio device 103 can prepare for handover. Also, the first radio device 102 receives 4 a handover message from the cellular network 100 comprising information about a second frequency resource and a second communication protocol. The second frequency resource and a second communication protocol can be used by the radio devices for radio communication aided by the NW 100, e.g. network assisted D2D communication or cellular communication. It should be noted that the handover message can in different embodiments be received 4 before, after or at the same time as the coverage message to the second radio device 103 is sent 3. Then, a handover of the D2D communication from the first frequency resource and communication protocol to the second frequency resource and communication protocol is initiated 5 by the first radio device 102 and/or by the second radio device 103. In some embodiment, also the network node is involved in the handover.

Figure 6:
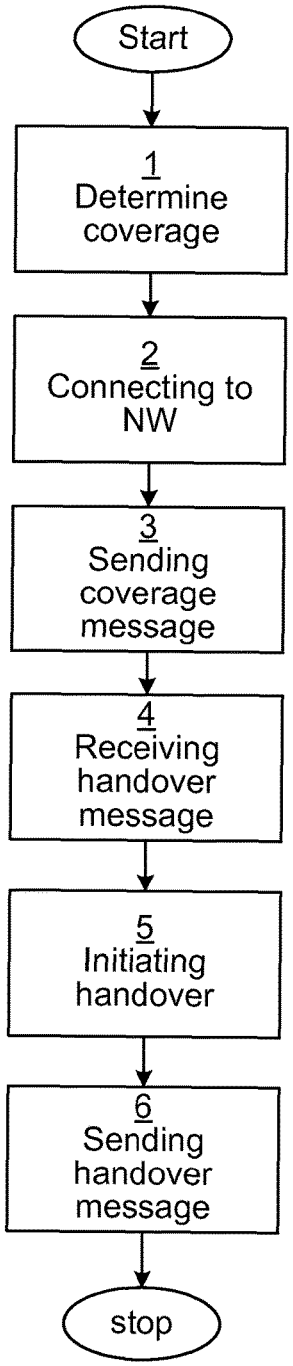
FIG. 6 is a schematic flow chart of another embodiment of a method of a first communication device, of the present disclosure.

FIG. 6 is a schematic flow chart of embodiments of a method of the present disclosure. The method of FIG. 6 is also performed in the first radio device 102. Again, the first radio device 102 is in non-NW assisted D2D radio communication with the second radio device 103. For this D2D communication, a first frequency resource and a first communication protocol is used. In this situation, the method embodiment of FIG. 6 can be applied. The first radio device 102 determines 1 that it is within coverage of a cellular network 100, e.g. inside the cell 104 of the base station 101. The first radio device connects 2 to the cellular network, e.g. to the network node base station 101. The first radio device 102 then sends 3 a coverage message to the second radio device, informing said second radio device that the first radio device is within coverage of the cellular network. Thus, the second radio device 103 can prepare for handover. Also, the first radio device 102 receives 4 a handover message from the cellular network 100 comprising information about a second frequency resource and a second communication protocol. The second frequency resource and a second communication protocol can be used by the radio devices for radio communication aided by the NW 100, e.g. network assisted D2D communication or cellular communication. It should be noted that the handover message can in different embodiments be received 4 before, after or at the same time as the coverage message to the second radio device 103 is sent 3. Then, a handover of the D2D communication from the first frequency resource and communication protocol to the second frequency resource and communication protocol is initiated 5 by the first radio device 102 and/or by the second radio device 103. Further, the first radio device 102 sends 6 a handover message to the second radio device 103, informing said second radio device of the second frequency resource and the second communication protocol received from the network. It should be noted that the handover message may be sent 6 before, after or during the initiation 5 of the handover. Thus, in some embodiments, the handover message is sent 6 to the second radio device 103, after which a handover of the D2D communication from the first frequency resource and communication protocol to the second frequency resource and communication protocol is initiated 5 by the first radio device 102 and/or by the second radio device 103.

Figure 7:
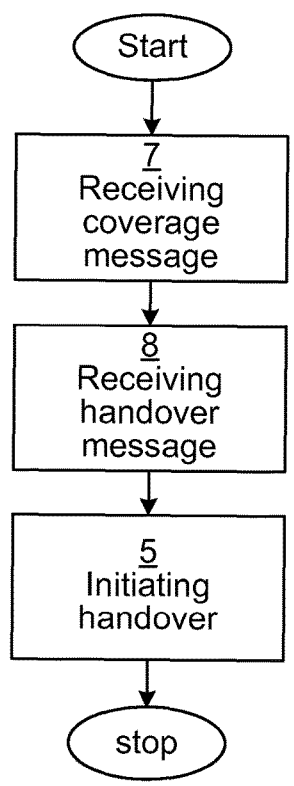
FIG. 7 is a schematic flow chart of an embodiment of a method of a second communication device, of the present disclosure.

FIG. 7 is a schematic flow chart of embodiments of a method of the present disclosure. The method of FIG. 7 is performed in the second radio device 103. Again, the first radio device 102 is in non-NW assisted D2D radio communication with the second radio device 103. For this D2D communication, a first frequency resource and a first communication protocol is used. In this situation, the method embodiment of FIG. 7 can be applied. The second radio device 103 receives 7 a coverage message from the first radio device 102, informing the second radio device that said first radio device is within coverage of the cellular network. Also, the second radio device 103 receives 8 a handover message from the first radio device 102, informing the second radio device of a second frequency resource and a second communication protocol. In analogy with the method embodiments of FIGS. 5 and 6, the handover message is in different embodiments received 8 before, after or at the same time as the coverage message is received 7. Then, a handover of the D2D communication from the first frequency resource and communication protocol to the second frequency resource and communication protocol is initiated 5 by the second radio device 103 and/or by the first radio device 102.

Figure 8:
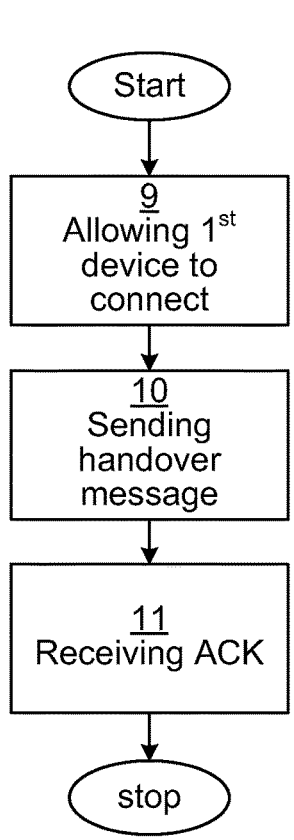
FIG. 8 is a schematic flow chart of an embodiment of a method of a network node, of the present disclosure.

FIG. 8 is a schematic flow chart of embodiments of a method of the present disclosure. The method of FIG. 8 is performed in the network node 101 of the cellular network 100. Again, the first radio device 102 is in non-NW assisted D2D radio communication with the second radio device 103. For this communication a first frequency resource and a first communication protocol is used. In this situation, the method embodiment of FIG. 8 can be applied. The network node 101 allows 9 the first radio device 102 to connect to the cellular network 100 via the network node, said first radio device 102 being in non-network assisted D2D communication with a second radio device 103 using a first frequency resource and a first communication protocol. The first radio device 102 may send information to the NW node 101 about the on-going non-NW assisted D2D communication with the second radio device 103. The information may include e.g. device identity of the second radio device 103, device capability of the first and/or second radio devices, the first frequency resource used and/or the first communication protocol used for the non-NW assisted D2D communication. Then, the network node 101 sends 10 a handover message to the first radio device 102, comprising information about a second frequency resource and a second communication protocol to which handover of the D2D communication should be initiated. Then, the network node 101 receives 11 an acknowledgement from the first radio device and relating to the sent 10 handover message. In some embodiments, the acknowledgement received 11 by the network node is an acknowledgement which is received as an acknowledgement (ACK) of that the handover message has been received 4 ok by the first radio device 102. In some embodiments, the acknowledgement received 11 by the network node is an acknowledgement which is received as an acknowledgement that the handover will be performed and/or has been completed.

Figure 9:
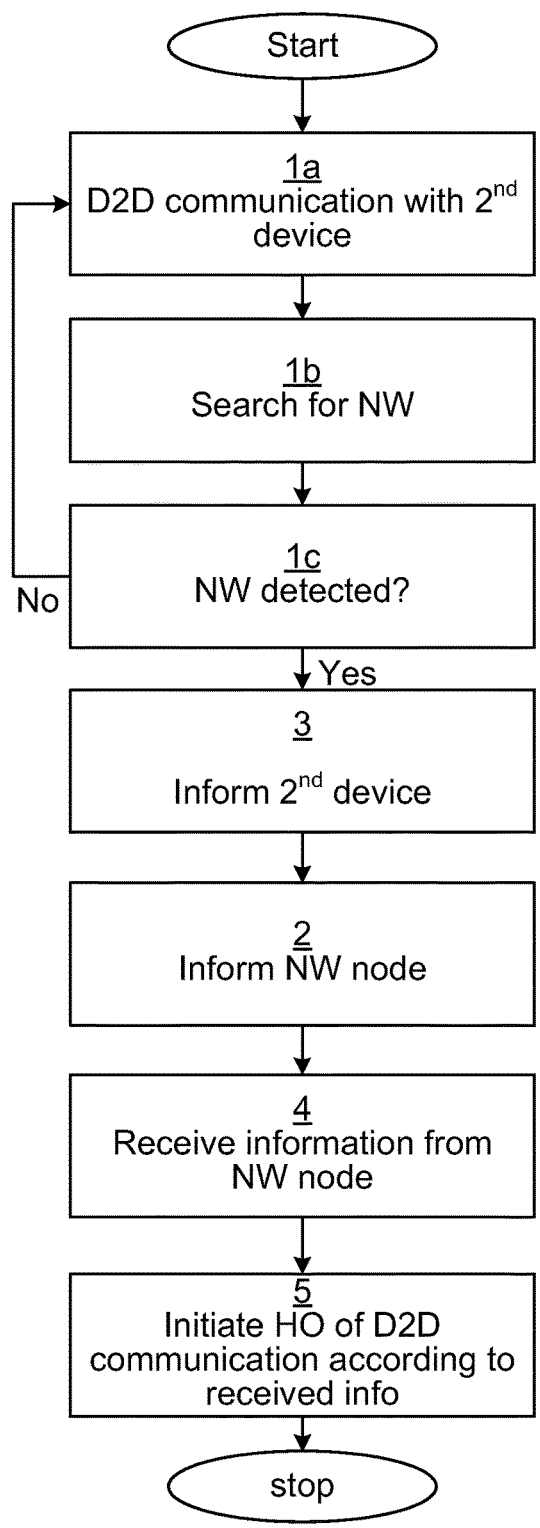
FIG. 9 is a schematic flow chart of another embodiment of a method of a first communication device, of the present disclosure.

FIG. 9 is a flow chart of a more specific embodiment of a method of the present disclosure. The method of FIG. 9 is performed by the first radio device 102. Here, the determining 1 that the first radio device is within coverage of a cellular network 100 has been divided into several substeps (1a, 1b and 1c). The first radio device 102 is in non-NW assisted D2D communication 1a with the second radio device 103. Both radio devices 102 and 103 are outside network coverage and hence the D2D communication is non-NW assisted. The D2D communication may e.g. use WIFI direct or Bluetooth in an unlicensed frequency band, or may use a D2D mode of the LTE standard and operate in a frequency band belonging to an LTE operator or in a frequency band used for NSPS. Other variants may alternatively apply, for instance use of WLAN/Bluetooth in a licenced (NSPS) spectrum or LTE D2D communication in unlicensed spectrum etc. The first radio device 102 on regular basis searches 1b for a cellular NW 100 on one or several frequency bands. The NW 100 may be an operator controlled NW (i.e. for commercial use) or may be a cellular NW operating in an NSPS frequency band. The search 1b may be performed according to prior art techniques of the radio access technology used in the particular frequency band. For instance, in LTE or WCDMA/HSPA, the first radio device 102 searches 1b for synchronization and pilot (reference) signals indicating a network node/base station 101, a cell 104 identity associated with the NW node 101, and the timing for transmissions from the NW node 101, all well known in the art. Once a new cell 104 is detected 1c

(yes), the radio device 102 reads broadcast information transmitted from the cell 104 and giving the radio device 102 information for determining whether the radio device 102 has access to camp/connect to the cell. If allowed to camp or connect to the cell, the first radio device 102 informs 3 the second radio device 103 about the detected NW. Different embodiments may then occur. In a first embodiment, there is a negotiation between the first and second radio devices about whether to inform the NW node 101 now or wait until the second radio device 103 detects a NW node of the network 100, i.e. comes under cellular coverage, or wait a certain time for the second radio device 103 to come into NW coverage and then if not within coverage during that time connect to and inform 2 the NW node 101. In case of waiting until the second radio device 103 comes into cellular coverage, the procedure is that the second radio device informs the first radio device when it is within coverage of the NW 100. Then the first radio device 102 informs 2 the NW node. The second radio device may in another embodiment inform the NW node 101 that it has come within coverage of the network 100 as well. In another embodiment, the first radio device 102 just informs 3 the second radio device 103 without negotiating with it. Then the first radio device 102 informs 2 the NW node 101 about the on-going non-NW assisted D2D communication, using communication principles and protocols for the cellular NW communication. Then, the first radio device 102 receives 4 information from the NW node 101 about how the on-going D2D communication should proceed. The first radio device 102 may in some embodiments then inform the second radio device 103 about how to proceed with the D2D communication. In other embodiments (if the second radio device 103 is within NW coverage), the NW node 101 (which the second radio device 103 is connected to, the same NW node which the first radio device 102 is connected to or a different NW node 101) may itself inform the second radio device. Then a handover (HO) of the D2D communication between the first and second radio devices is initiated 5 in accordance with the information received 4 from the NW node 101. Here, different versions could again be envisioned. In a first embodiment, if the second radio device 103 is also within NW coverage, the NW node 101 informs/configures 4 the radio device(s) to initiate 5 a handover to ordinary cellular communication (i.e. the first radio device communicates with the second radio device via NW node(s) 101). In another embodiment, applicable to both cases (i.e. one or both radio devices 102 and 103 are within NW coverage) is that the NW initiates a HO to a NW assisted D2D communication. NW assisted D2D communication typically means that the NW 100 is in control of which time/frequency (T/F) resources to use for D2D communication as well as the radio access technology to use. For instance, some F/T resources of the ordinary cellular frequency band may be reserved for D2D communication and D2D may be made according to an LTE D2D communication standard. In another example, a specific frequency band is allocated for NW assisted D2D communication, and the D2D uplink-downlink pair is allocated a subset of the F/T resources for their communication. In this case, an LTE D2D communication standard could be used, or another standard like Bluetooth (BT) or WIFI direct (hence NW controlled WIFI direct or BT) or FlashlinQ.

The initiation 5 of the HO (in case NW assisted D2D is used), typically comprises the steps of; the first and second radio devices 102 and 103 receive information about a time instant when to start the communication using the second frequency resource and second communication protocol; the first and second radio devices 102 and 103 start communicating at that time instant by one of the radio devices (defined by the NW or negotiated between the devices, here typically the first radio device 102) transmitting a beacon (or synchronization or pilot) signal, the second radio device 103 tries to detect that signal, and once detection is made, an acknowledgement signal (maybe together with a beacon, sync or pilot signal) is transmitted from the second radio device to the first radio device. Once the first radio device detects that ACK signal, the D2D communication between the radio devices is made according to the received 4 second frequency resource and second communication protocol, according to the information/configuration sent from the NW 100.

Below follow some other embodiments of the present disclosure.

According to another aspect of the present disclosure, there is provided a first radio device configured for being in non-network assisted D2D communication with a second radio device using a first frequency resource and a first communication protocol. The first radio device comprises means for determining that the first radio device is within coverage of a cellular network. The first radio device also comprises means for connecting to the cellular network. The first radio device also comprises means for sending a message to the second radio device, informing said second radio device that the first radio device is within coverage of the cellular network. The first radio device also comprises means for receiving a message from the cellular network comprising information about a second frequency resource and a second communication protocol. The first radio device also comprises means for initiating a handover of the D2D communication from the first frequency resource and communication protocol to the second frequency resource and communication protocol.

According to another aspect of the present disclosure, there is provided a second radio device configured for being in non-network assisted D2D communication with a first radio device using a first frequency resource and a first communication protocol. The second radio device comprises means for receiving a message from the first radio device, informing the second radio device that said first radio device is within coverage of the cellular network. The second radio device also comprises means for receiving a message from the first radio device, informing the second radio device of a second frequency resource and a second communication protocol. The second radio device also comprises means for initiating a handover of the D2D communication from the first frequency resource and communication protocol to the second frequency resource and communication protocol.

According to another aspect of the present disclosure, there is provided a network node of a cellular network. The network node comprises means for allowing a first radio device to connect to the cellular network via the network node, said first radio device being in non-network assisted D2D communication with a second radio device using a first frequency resource and a first communication protocol. The network node also comprises means for sending a message to the first radio device, comprising information about a second frequency resource and a second communication protocol to which handover of the D2D communication should be initiated. The network node also comprises means for receiving an acknowledgement from the first radio device and relating to the sent handover message.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a first radio device in non-network assisted device-to-device (D2D) communication with a second radio device using a first frequency resource and a first communication protocol, the method comprising:
while operating in non-network assisted D2D communication with the second radio device using the first frequency resource and the first communication protocol, determining that the first radio device is within coverage of a cellular network;
connecting to the cellular network;
sending a coverage message to the second radio device, informing said second radio device that the first radio device is within coverage of the cellular network;
conducting a negotiation with the second radio device as to when to inform the cellular network of the non-network assisted D2D communication between the first radio device and the second radio device;
sending a message to the cellular network informing the cellular network of the non-network assisted D2D communication between the first radio device and the second radio device based upon the negotiation;
receiving a handover message from the cellular network comprising information about a second frequency resource and a second communication protocol; and
initiating a handover of the non-network assisted D2D communication using the first frequency resource and the first communication protocol to network-assisted D2D communication using the second frequency resource and the second communication protocol, thereby enabling D2D communication between the first radio device and the second radio device to continue by switching operation to network assisted D2D communication with assistance of the cellular network using the second frequency resource and the second communication protocol.

2. The method of claim 1, further comprising:
sending a message to the second radio device informing said second radio device of the second frequency resource and the second communication protocol received from the network.

3. The method of claim 1, wherein the first radio device is connected to the cellular network via a first network node and the second radio device is connected to the cellular network via a second, different, network node before the initiating of the handover.

4. The method of claim 1, wherein the first frequency resource is within an unlicensed frequency band.

5. The method of claim 1, wherein the first communication protocol is one of a Wireless Local Area Network protocol a Bluetooth protocol, a FlashlinQ protocol, and a Zigbee protocol.

6. The method of claim 1, wherein the first communication protocol is a long term evolution (LTE) D2D communication protocol.

7. A method of a second radio device in non-network assisted device-to-device (D2D) communication with a first radio device using a first frequency resource and a first communication protocol, the method comprising:
while operating in non-network assisted D2D communication with the first radio device using the first frequency resource and the first communication protocol, receiving a coverage message from the first radio device, informing the second radio device that said first radio device is within coverage of the cellular network;
conducting a negotiation with the first radio device as to when to inform the cellular network of the non-network assisted D2D communication between the first radio device and the second radio device;
receiving a handover message from the first radio device, informing the second radio device of a second frequency resource and a second communication protocol; and
initiating a handover of the non-network assisted D2D communication using the first frequency resource and the first communication protocol to network-assisted D2D communication using the second frequency resource and the second communication protocol, thereby enabling D2D communication between the first radio device and the second radio device to continue by switching operation to network assisted D2D communication with assistance of the cellular network using the second frequency resource and the second communication protocol.

8. A method of a network node of a cellular network, the method comprising:
allowing a first radio device to connect to the cellular network via the network node;
receiving a notification from the first radio device that said first radio device is in non-network assisted device-to-device (D2D) communication with a second radio device using a first frequency resource and a first communication protocol, said notification being received based on a negotiation between the first radio device and the second radio device as to when said notification should be sent by the first radio device;
sending a handover message to the first radio device, comprising information about a second frequency resource and a second communication protocol to which handover of the non-network assisted D2D communication using the first frequency resource and the first communication protocol to network-assisted D2D communication using the second frequency resource and the second communication protocol should be initiated, thereby enabling D2D communication between the first radio device and the second radio device to continue by switching operation to network assisted D2D communication with assistance of the cellular network using the second frequency resource and the second communication protocol; and
receiving an acknowledgement from the first radio device relating to the sent handover message.

9. The method of claim 8, wherein the network node is one of a base station, a radio access network node, or a core network node.

10. A nontransitory processor-readable storage medium comprising a computer program for a first radio device in non-network assisted device-to-device (D2D) communication with a second radio device using a first frequency resource and a first communication protocol, the computer program comprising computer program code which, when run on a processor of the first radio device, causes the first radio device to:
while operating in non-network assisted D2D communication with the second radio device using the first frequency resource and the first communication protocol, determine that the first radio device is within coverage of a cellular network;

connect to the cellular network;
send a coverage message to the second radio device, informing said second radio device that the first radio device is within coverage of the cellular network;
conduct a negotiation with the second radio device as to when to inform the cellular network of the non-network assisted D2D communication between the first radio device and the second radio device;
send a message to the cellular network informing the cellular network of the non-network assisted D2D communication between the first radio device and the second radio device based upon the negotiation;
receive a handover message from the cellular network comprising information about a second frequency resource and a second communication protocol; and
initiate a handover of the non-network assisted D2D communication using the first frequency resource and the first communication protocol to network-assisted D2D communication using the second frequency resource and the second communication protocol, thereby enabling D2D communication between the first radio device and the second radio device to continue by switching operation to network assisted D2D communication with assistance of the cellular network using the second frequency resource and the second communication protocol.

11. A nontransitory processor-readable storage medium comprising a computer program for a second radio device in non-network assisted device-to-device (D2D) communication with a first radio device using a first frequency resource and a first communication protocol, the computer program comprising computer program code which, when run on a processor of the second radio device, causes the second radio device to:
while operating in non-network assisted D2D communication with the first radio device using the first frequency resource and the first communication protocol, receive a coverage message from the first radio device, informing the second radio device that said first radio device is within coverage of the cellular network;
conduct a negotiation with the first radio device as to when to inform the cellular network of the non-network assisted D2D communication between the first radio device and the second radio device;
receive a handover message from the first radio device, informing the second radio device of a second frequency resource and a second communication protocol; and
initiate a handover of the non-network assisted D2D communication using the first frequency resource and the first communication protocol to network-assisted D2D communication using the second frequency resource and the second communication protocol, thereby enabling D2D communication between the first radio device and the second radio device to continue by switching operation to network assisted D2D communication with assistance of the cellular network using the second frequency resource and the second communication protocol.

12. A nontransitory processor-readable storage medium comprising a computer program for a network node of a cellular network, the computer program comprising computer program code which, when run on a processor of the network node, causes the network node to:
allow a first radio device to connect to the cellular network via the network node;
receive a notification from the first radio device that said first radio device is in non-network assisted device-to-device (D2D) communication with a second radio device using a first frequency resource and a first communication protocol, said notification being received based on a negotiation between the first radio device and the second radio device as to when said notification should be sent by the first device;
send a handover message to the first radio device, comprising information about a second frequency resource and a second communication protocol to which handover of the non-network assisted D2D communication using the first frequency resource and the first communication protocol to network-assisted D2D communication using the second frequency resource and the second communication protocol should be initiated, thereby enabling D2D communication between the first radio device and the second radio device to continue by switching operation to network assisted D2D communication with assistance of the cellular network using the second frequency resource and the second communication protocol; and
receive an acknowledgement from the first radio device and relating to the sent handover message.

13. A radio device configured for being in non-network assisted device-to-device (D2D) communication with another radio device using a first frequency resource and a first communication protocol, the radio device comprising:
a processor; and
a storage unit storing instructions that, when executed by the processor, cause the radio device to:
while operating in non-network assisted D2D communication with the other radio device using the first frequency resource and the first communication protocol, determine that the radio device is within coverage of a cellular network;
connect to the cellular network;
send a coverage message to the other radio device, informing said other radio device that the radio device is within coverage of the cellular network;
conduct a negotiation with the other radio device as to when to inform the cellular network of the non-network assisted D2D;
send a message to the cellular network informing the cellular network of the non-network assisted D2D communication based upon the negotiation;
receive a handover message from the cellular network comprising information about a second frequency resource and a second communication protocol; and
initiate a handover of the non-network assisted D2D communication using the first frequency resource and the first communication protocol to network-assisted D2D communication using the second frequency resource and the second communication protocol, thereby enabling D2D communication between the radio devices to continue by switching operation to network assisted D2D communication with assistance of the cellular network using the second frequency resource and the second communication protocol.

14. A radio device configured for being in non-network assisted device-to-device (D2D) communication with another radio device using a first frequency resource and a first communication protocol, the radio device comprising:
a processor; and
a storage unit storing instructions that, when executed by the processor, cause the radio device to:
while operating in non-network assisted D2D communication with the other radio device using the first frequency resource and the first communication protocol, receive a coverage message from the other radio device, informing the radio device that said other radio device is within coverage of the cellular network;

conduct a negotiation with the other radio device as to when the cellular network should be informed of the non-network assisted D2D communication;

receive a handover message from the other radio device, informing the radio device of a second frequency resource and a second communication protocol; and initiate a handover of the non-network assisted D2D communication using the first frequency resource and the first communication protocol to network-assisted D2D communication using the second frequency resource and the second communication protocol, thereby enabling D2D communication between the radio devices to continue by switching operation to network assisted D2D communication with assistance of the cellular network using the second frequency resource and communication protocol.

15. A network node of a cellular network, the network node comprising:

a processor; and a storage unit storing instructions that, when executed by the processor, cause the network node to:

allow a first radio device to connect to the cellular network via the network node;

receive a notification from the first radio device that said first radio device is in non-network assisted device-to-device (D2D) communication with a second radio device using a first frequency resource and a first communication, said notification being received based on a negotiation between the first radio device and the second radio device as to when said notification should be sent by the first device;

send a handover message to the first radio device, comprising information about a second frequency resource and a second communication protocol to which handover of the non-network assisted D2D communication using the first frequency resource and the first communication protocol to network-assisted D2D communication using the second frequency resource and the second communication protocol should be initiated, thereby enabling D2D communication between the first radio device and the second radio device to continue by switching operation to network assisted D2D communication with assistance of the cellular network using the second frequency resource and the second communication protocol; and receive an acknowledgement from the first radio device and relating to the sent handover message.

* * * * *